(12) United States Patent
Cormier et al.

(10) Patent No.: US 7,404,593 B2
(45) Date of Patent: Jul. 29, 2008

(54) MODULAR ENERGY ABSORBER OF VARYING TOPOGRAPHY AND METHOD FOR CONFIGURING SAME

(75) Inventors: Joel Matthew Cormier, Ferndale, MI (US); Richard Francois Audi, Dearborn, MI (US)

(73) Assignee: Oakwood Energy Management Inc., Dearborn, MI (US)

(*) Notice: Subject to any disclaimer, the term of this patent is extended or adjusted under 35 U.S.C. 154(b) by 183 days.

(21) Appl. No.: 11/014,418

(22) Filed: Dec. 16, 2004

(65) Prior Publication Data

US 2005/0161982 A1    Jul. 28, 2005

Related U.S. Application Data

(63) Continuation-in-part of application No. 10/760,760, filed on Jan. 20, 2004, which is a continuation of application No. 10/004,739, filed on Dec. 4, 2001, now Pat. No. 6,752,450, which is a continuation-in-part of application No. 09/884,813, filed on Jun. 19, 2001, now Pat. No. 6,682,128, and a continuation-in-part of application No. 09/617,691, filed on Jul. 17, 2000, now Pat. No. 6,679,967, which is a continuation-in-part of application No. 09/499,205, filed on Feb. 7, 2000, now Pat. No. 6,247,745.

(51) Int. Cl.
*B60R 21/04* (2006.01)

(52) U.S. Cl. .................. 296/187.03; 293/133; 280/751; 188/371

(58) Field of Classification Search ............. 296/187.03
See application file for complete search history.

(56) References Cited

U.S. PATENT DOCUMENTS

| 3,018,015 | A | * | 1/1962 | Agriss et al. ................. 428/180 |
| 4,739,762 | A | | 4/1988 | Palmaz |
| 5,972,477 | A | * | 10/1999 | Kim et al. ................... 428/175 |
| 6,679,544 | B1 | | 1/2004 | Hubbert et al. |
| 6,715,592 | B2 | | 4/2004 | Suzuki et al. |

FOREIGN PATENT DOCUMENTS

| DE | 19947245 A | 4/2000 |
| EP | 0863056 A | 9/1998 |

OTHER PUBLICATIONS

PCT International Search Report and Written Opinion, Int'l Filing Date: Dec. 12, 2005, Application No. PCT/US05/44896, Applicant: Oakwood Energy Management, Inc., 7 pages.

* cited by examiner

*Primary Examiner*—Joseph D Pape
(74) *Attorney, Agent, or Firm*—Brooks Kushman P.C.

(57) ABSTRACT

A modular energy absorber 10 that is tunable. It comprises one or more energy absorbing modules 12. The energy absorbing modules have means for coordinating energy absorbing units 16 of the one or more modules. The means 14 for coordinating position and support the units in relation to each other before, during and after relative motion between an incident object and the energy absorber. A crushable member 16 is provided that has an upper perimeter 22, a lower perimeter 24 and an intermediate wall 26 extending therebetween. It also includes a number (m) of breaches defined therein before impact. A method for configuring the modular energy absorber is also disclosed.

20 Claims, 8 Drawing Sheets

MODULAR ENERGY ABSORBER OF VARYING TOPOGRAPHY AND METHOD FOR CONFIGURING SAME

CROSS-REFERENCE TO RELATED APPLICATIONS

This application is a continuation-in-part of U.S. application Ser. No. 10/760,760 filed Jan. 20, 2004, which is a continuation of U.S. application Ser. No. 10/004,739 filed Dec. 4, 2001 (now U.S. Pat. No. 6,752,450), which is a continuation-in-part of U.S. application Ser. No. 09/884,813 filed Jun. 19, 2001 (now U.S. Pat. No. 6,682,128) which is a continuation-in-part of U.S. application Ser. No. 09/499,205 filed Feb. 7, 2000 (now U.S. Pat. No. 6,247,745), the disclosures of which applications are being incorporated by reference herein. Application Ser. No. 10/760,760 is also a continuation-in-part of U.S. application Ser. No. 09/617,691 filed Jul. 17, 2000 (now U.S. Pat. No. 6,679,967), the disclosure of which application is being incorporated by reference herein.

BACKGROUND OF THE INVENTION

1. Field of the Invention

This invention generally relates to occupant safety during a collision, and more specifically to a "customized" or "tunable" energy absorber that absorbs energy imparted by an incident object that impacts the absorber, and a method for configuring the absorber.

2. Background Art

The National Highway Traffic and Safety Administration has been asked by Congress to improve protection for vehicle occupants, especially children, in side-impact crashes. Side collisions can be particularly deadly for infants, even if they are strapped in child seats. About 40% of children who died strapped in such seats were killed in side-impact crashes, according to one analysis of almost 100 fatal crashes by the Insurance Institute for Highway Safety. A study by the Childrenh's National and Medical Center in 2000 found that the side door panel was the primary source of contact for injuries suffered in lateral crashes. Other studies have suggested that an evaluation of the side-impact protection afforded by primary source of contact for injuries suffered in lateral crashes. Other studies have suggested that an evaluation of the side-impact protection afforded by automobiles should contemplate ways in which to preserve the occupant's space during a lateral collision to better protect all occupants.

There have been proposed various ways to protect the occupant or rider of an automobile when the occupant impacts the A and B pillars, headliner, or any hard structure during an impact. Illustrative approaches are described in commonly owned U.S. Pat. Nos. 6,247,745; 6,199,942; 6,679,967; 6,682,128; 6,752,450; and 6,443,513, which issued on Sep. 3, 2002 to Glance.

It is known, for example, to deploy truncated plastic cones at rollover stiff points or on door panels for side impacts with the objective of providing better performance than energy absorbent foam. Also, such cones may be less expensive to manufacture. Manufacturing economics have been realized from the raw materials being melt recyclable. Such structures not only provide weight savings and a better performance, but also a cost advantage which may amount to $4-$5 per vehicle.

Some of the required energy absorption characteristics are defined in Federal Motor Vehicle Standards 201. To meet the relevant standards, the industry continues its quest not only for the physical structures that conform to federally mandated standards, but also to develop computer modeling protocols that predict head injury sustained from impacting forces and comparing the results with head injury criteria. It would be desirable in such developments to measure actual head impact (of, for example, a dummy occupant) during in-vehicle testing at selected locations in the vehicle. Ideally, the actual measurements will approximate the values predicted by computer dynamic finite element analysis.

Additionally, the desire to reduce costs while complying with End of Life Vehicle (ELV) legislation in Europe stimulates the use of mono-materials in automotive interior soft trim applications. Related considerations emphasize the recyclability of automotive plastics. The impact or influence of the ELV directive on automotive interiors will be felt in various ways: e.g., cost effective use of recycling techniques with environmentally benign consequences. Most interior modules today are made from a combination of skin/foam/substrate. Thus, the materials currently used may present challenges to the recycling task. Such challenges may be met by more use of energy absorbing modules that are made from mono-materials. Such materials might, for example, include polyolefins and melt recyclable polymers, since they show promise as being versatile alternatives to skin/foam/substrate.

It is expected that Europe will adopt the U.S. HIC(d) requirements. This will affect the choice and quantity of materials used for energy absorbers in headliners. Similar door trim panel requirements apply to the pelvis and torso (side impact applications). It is therefore anticipated that there will be an increase in the usage of energy absorbers that will be incorporated into the structure of modules such as door trim panels, instrument panel uppers, and headliners.

To meet cost reduction goals, there is an increasing desire to manufacture interior modules using a reduced number of manufacturing steps.

In light of these and related approaches, there remains the desire to absorb as much impact energy in as little crush distance as possible, with as little weight as possible, yet be capable of being designed and manufactured under favorable economic conditions.

The absorber may, for example, be positioned in a vehicle headliner, in an A-pillar, B-pillar, or in other locations. Generally, the energy absorber is positioned between a vehicle occupant and an incident force. It serves to at least partially cushion a blow and thus protect the occupant from severe injury.

SUMMARY OF THE INVENTION

One object of the present invention is to provide a more cost effective, efficient energy absorber that can be "customized" or "tuned" to produce predefined energy absorption characteristics within spatial constraints that may be imposed by a particular application.

The invention includes a modular energy absorber with one or more energy absorbing modules (e.g. an assembly of recesses) that are provided with means (e.g. a base or a tether) for coordinating energy absorbing units therewithin. As used herein the term "energy absorbing module" means an assembly of energy units that are united by a common means for coordinating them. The means for coordinating is terminated by a continuous periphery so that within the periphery, the means for coordinating may be planar, curved, or curvilinear. The coordinating means has a flat or curved topography with a variable number (n) of apertures, where n is an integer $\geq 0$. The means for coordinating alternatively includes a web, a tether, a hinge, a planar or curved surface, and wings or combinations thereof that serve to position and support the energy absorbing units in relation to each other before, during and after relative motion between an incident object and the energy absorber. Impact between the energy absorbing units and the incident object result in forces that are at least partially absorbed so that a blow imparted to a vehicle occupant is cushioned.

The absorber also has energy absorbing units (e.g. recesses) that have a crushable member (e.g. a wall) with an upper extremity that defines an upper perimeter, a lower extremity that defines a lower perimeter, and an intermediate section extending therebetween. Either the upper or lower extremities can be presented to the impacting force.

The crushable member of an energy absorbing unit at least partially collapses during energy absorption to a crushed configuration which in part is determined by the provision of a number (m) of breaches that are defined in the crushable member before impact, where m is an integer $\geq 0$. The breaches may be defined by slits (no material moved) or slots (material removed to form an opening), or both. Thus, within a given energy absorbing module, the means for coordinating may or may not be flat and may or may not have a number (n) of apertures; one or more of the energy absorbing units in a given module may be provided with a number (m) of breaches (e.g. slits, or slots, or slits and slots, or neither slits nor slots); and the means for coordinating may be provided with a flat or curved topography.

At least some of the energy absorbing units have a rim, a first wall extending between the base and the rim, a first floor, and a second wall extending between the rim and the first floor. In one embodiment, this provides a volcano-or crater-shaped floor to the energy absorbing units. In an alternative embodiment, a dome—or convex—shape is thereby imparted to the energy absorbing the units. (duplicated below)

To configure the modular energy absorber, the following steps are taken:
  selecting one or more energy absorbing units according to given spatial constraints and desired energy absorbing criteria;
  providing a means for coordinating energy absorbing units with a pre-defined contoured topography;
  locating one or more energy absorbing units in association with the means for coordinating energy absorbing units so that the one or more energy absorbing units are positioned in relation to each other before, during and after relative motion between an incident object and the energy absorber;
  providing a wall within some of the one or more energy absorbing units so that the wall provides an upper perimeter, a lower perimeter, and an intermediate section extending therebetween;
  locating a first wall and a second wall that extends between the rim or upper perimeter and the first floor to provide a volcano- or crater-like dome to at least some of the energy absorbing units;
  defining a number (m) of breaches within the wall, (m) being an integer selected from the group consisting of (0, 1, 2, 3, . . . , 1000); and
  providing a number (n) of apertures defined within the means for coordinating energy absorbing units, (n) being an integer selected from the group consisting of (0, 1, 2, 3, . . . , 1000).

BRIEF DESCRIPTION OF THE DRAWINGS

FIG. 1(*b*) is a quartering side elevational view thereof;

FIG. 1(*c*) is a cross-sectional view taken along the line I-I of FIG. 1(*a*);

FIGS. 1(*d-e*) are top views of absorbers provided with slits and slots;

FIG. 2(*b*) is a vertical section (pre-impact) thereof, enlarged to facilitate an understanding of several of its characteristics.

DETAILED DESCRIPTION OF THE PREFERRED EMBODIMENT(S)

1. The Energy Absorber

Figure 1A:
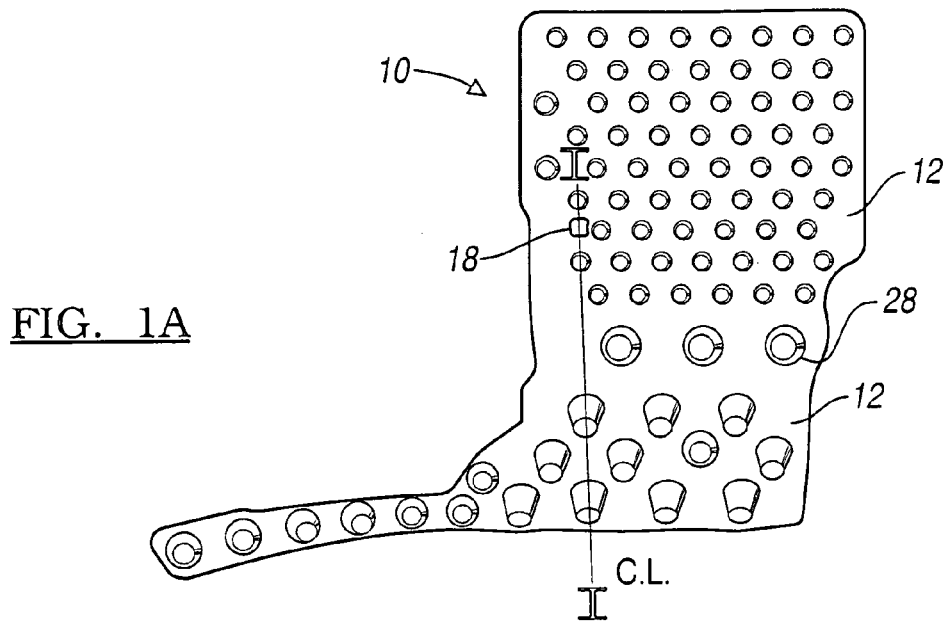
FIG. 1(*a*) is a top plan view of a modular energy absorber constructed in accordance with the present invention, including one of the energy absorbing modules having several energy absorbing units that extend from one or more coordinating means.
Figure 1B:
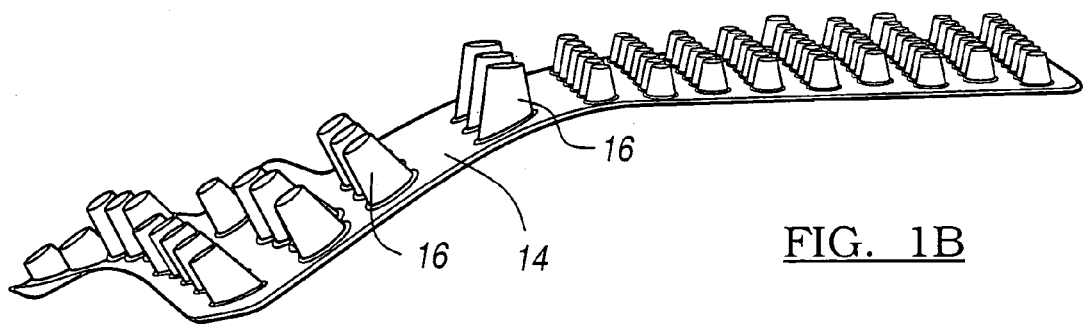
Figure 1C:
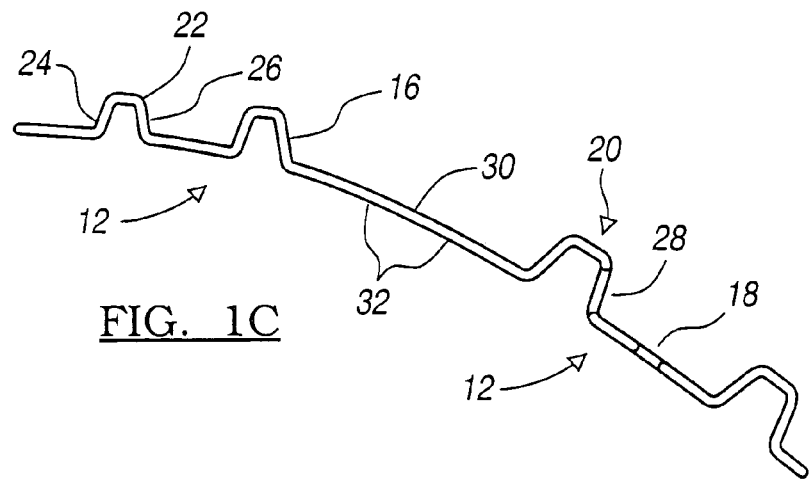
Figure 1D:
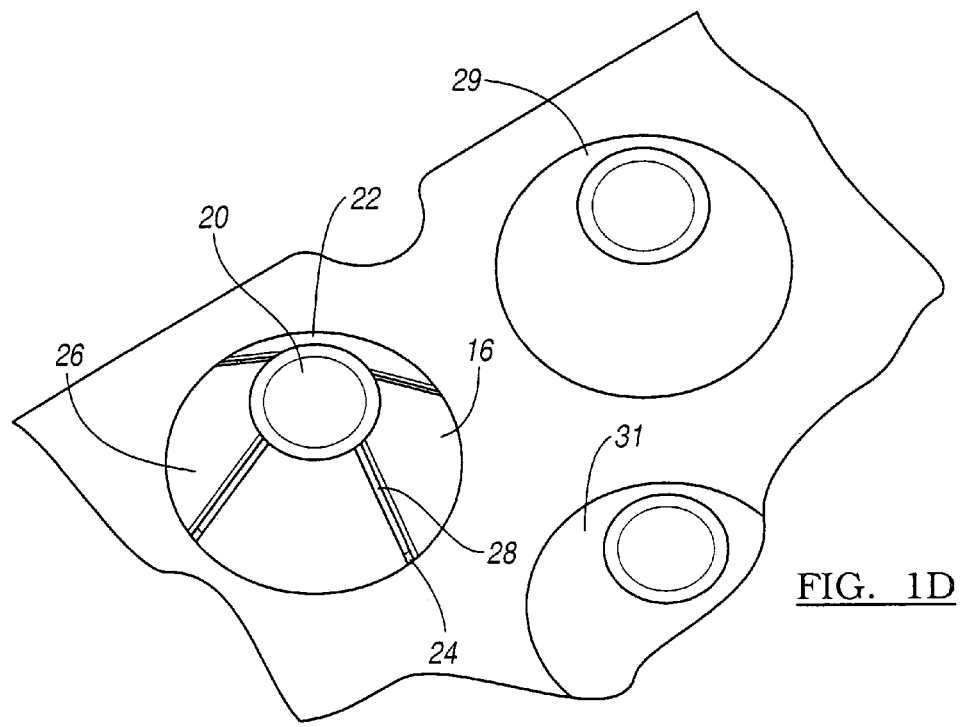
Figure 1E:
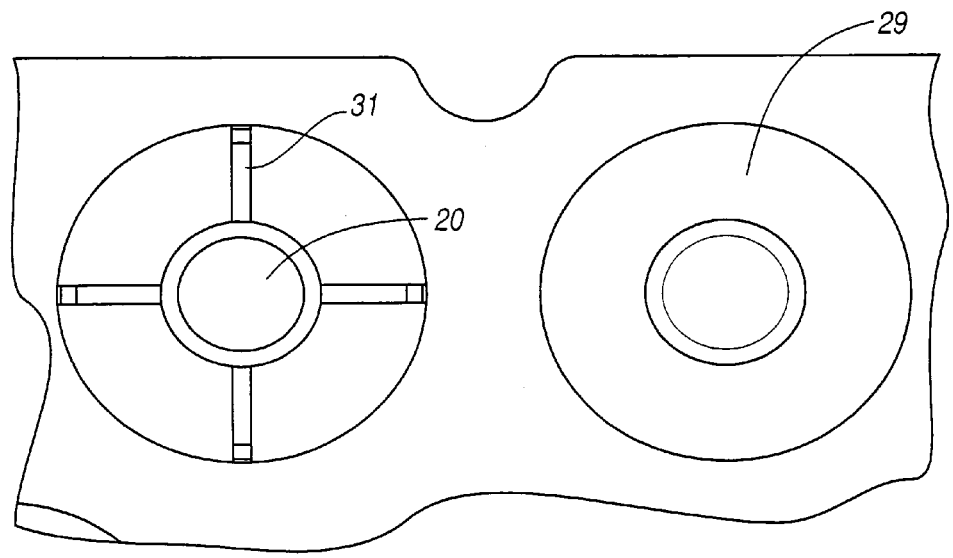
Figure 2A:
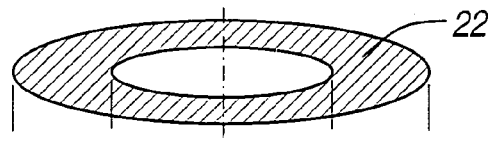
FIGS. 2(*a* & *c*) are lateral sections of opposite ends of an energy absorbing unit.
Figure 2B:
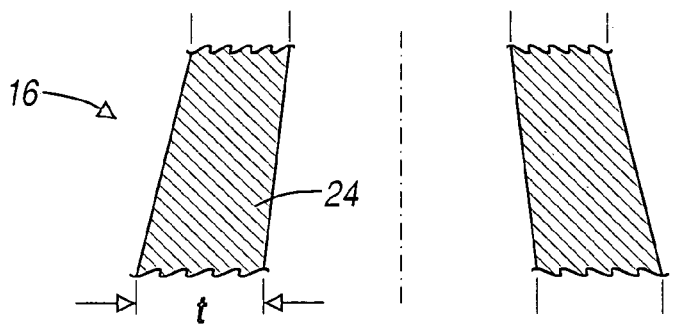
Figure 2C:
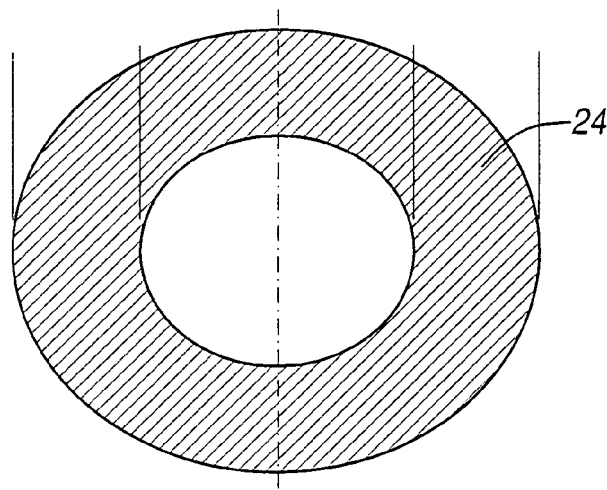

Turning first to FIGS. 1-2 of the drawings, there is depicted a modular energy absorber 10 that has one or more energy absorbing modules 12. The definition of the "energy absorbing module" which appears in the summary section of this application is incorporated here by reference.

Each module includes means 14 (FIG. 1(*b*)), such as a basal structure, for coordinating energy absorbing units 16 of a given energy absorbing module. The means for coordinating 14 has a topography that includes a number (n) of apertures 18 (note: regarding 18, that the drawing does not show a true through hole) defined therein, where n is an integer $\geq 0$. The modular energy absorber 10 is characterized by energy absorbing units 16 that are connected by coordinating means 14 so that they give resistance and then buckle when impacted with sufficient force. In one embodiment, the energy absorbing units 16 take the form of truncated cones. The units are further characterized by certain shapes, dimensions, and wall thicknesses that can be customized or "tuned" using non-linear finite element analysis software to model a desired energy absorber.

It will be appreciated that in a given application, a number of energy absorbing modules 12 may be affixed to a substrate. The substrate helps to position and configure energy absorbing modules to suit the needs by way of a non-limiting example, a vehicular headliner that extends across a "B" pillar.

The absorber is used, for example, in both head and side impact occupant protection applications. In either case, one or more modular energy absorbers are mounted between the interior trim and the body structure of an automobile, often where space is limited. Designs of specific forms of absorber vary greatly when customizing them to fit and perform within the geometrical environments and constraints into which they are packaged.

In general, the disclosed energy absorbing units are assessed by observing the outputs from the instrumented headform or test dummy including force versus displacement and acceleration versus time responses.

As to be described in greater detail herein, the disclosed energy absorbers preferably are made from polymers. Balancing cost, performance and formability, a selection of polypropylene (PPØ) and acrylonitrile butadiene styrene (ABS) material grade can be used. Specifically, these include Basell Polyolefins Pro-fax SV152, Polypropylene Copolymer (SV152), BP Petrochemicals Polypropylene Copolymer 3045, and General Electric Cycolac EX75 (EX75).

The energy absorbing units 16 coordinate with each other through the provision of coordinating means 14 that position and support the units in relation to each other before, during and after relative motion between an incident object (not shown) and the energy absorber 10. That relative motion causes impact between the energy absorbing units 16 and the incident object so that forces resulting therefrom are at least partially absorbed. In this way, the impact forces that are transmitted to an occupant of a vehicle within which, for example, the modular energy absorber 10 is situated are reduced. Also, the injuries sustained may be lessened.

As shown in FIGS. 1(d)-1(e), at least some of the energy absorbing units 16 include an upper extremity or perimeter 22, a lower extremity or perimeter 24, and an intermediate section or wall 26 extending therebetween.

Additionally, a number (m) of breaches 28 (FIGS. 1(d)-1(e)) are defined within the crushable unit 16 before impact. Although 4 breaches are depicted in FIG. 1(c), preferably, the number of breaches is 3 where the breach is provided in the form of slots 31. As used in this disclosure, "breaches" include slits and slots. The term "slots" implies an aperture with facing edges which lacks material or from which material has been removed. As used herein, the term "slits" implies a cut or gash 29 that is formed without the removal of material. In the preferred embodiment, the slots are inclined to an axis of symmetry of a given crushable unit 16 when the crushable unit 16 is presented in the form of a thermoformed cone.

As depicted in FIG. 1(c), the modular energy absorber includes, in the embodiment depicted, a hinge section 30 having leaves 32. Each leaf 32 extends from one of the one or more energy absorbing modules 12 so that they may be configured within the spatial constraints that are imposed by an environment within which the modular energy absorber 10 is positioned. The environment (not depicted) is selected from a group consisting of a headliner in a vehicle, a bumper assembly, a knee bolster, and a side impact location including a vehicle pillar, a door, an armrest, a head rest or seat back.

In one embodiment, the means for coordinating 14 the energy absorbing units 16 takes the form of a web, a tether, a hinge, a planar surface (as depicted), and rings, or a combination thereof. In some cases, no apertures (n=0) are provided in the energy absorbing coordinating means.

Figure 3:
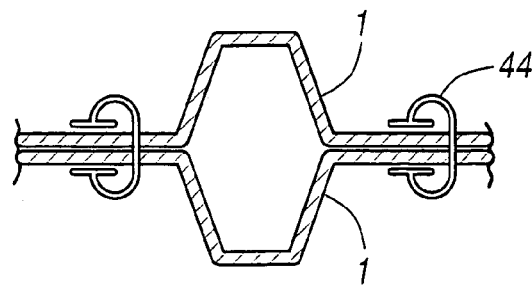
FIG. 3 is a cross-sectional view of a stacked configuration of energy absorbing units, including means for cooperating the impact resistance characteristics of the energy absorbers.

In FIG. 3, cooperating means 44 are provided in order to coordinate the deformation and energy absorbing characteristics of adjacent energy absorbing units 16. It will be appreciated that the cooperating means may take the form of an adhesive, a clip, a vibration weld, a sonic weld, a heat stake, a "tongue in groove" arrangement, and the like. It will also be appreciated that the stacked configuration depicted in FIG. 3 may be reoriented such that the energy absorbing units 16 may be nested in such a way that the peak of a given unit may lie in a valley (or floor) of the adjacent unit.

Figure 4:
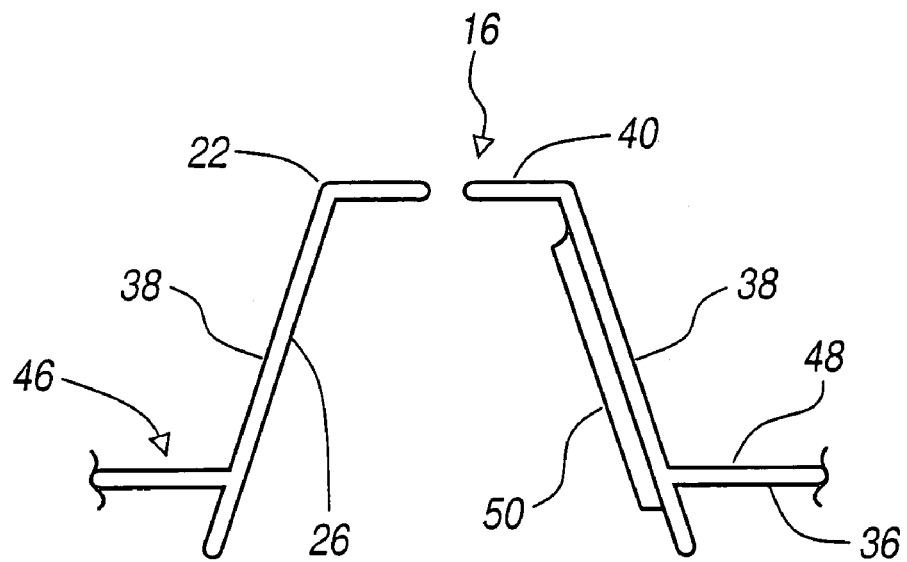
FIG. 4 is a cross-sectional view of an energy absorbing unit that illustrates an intersection between means for coordinating energy absorbing units and an intermediate wall.
Figure 12:
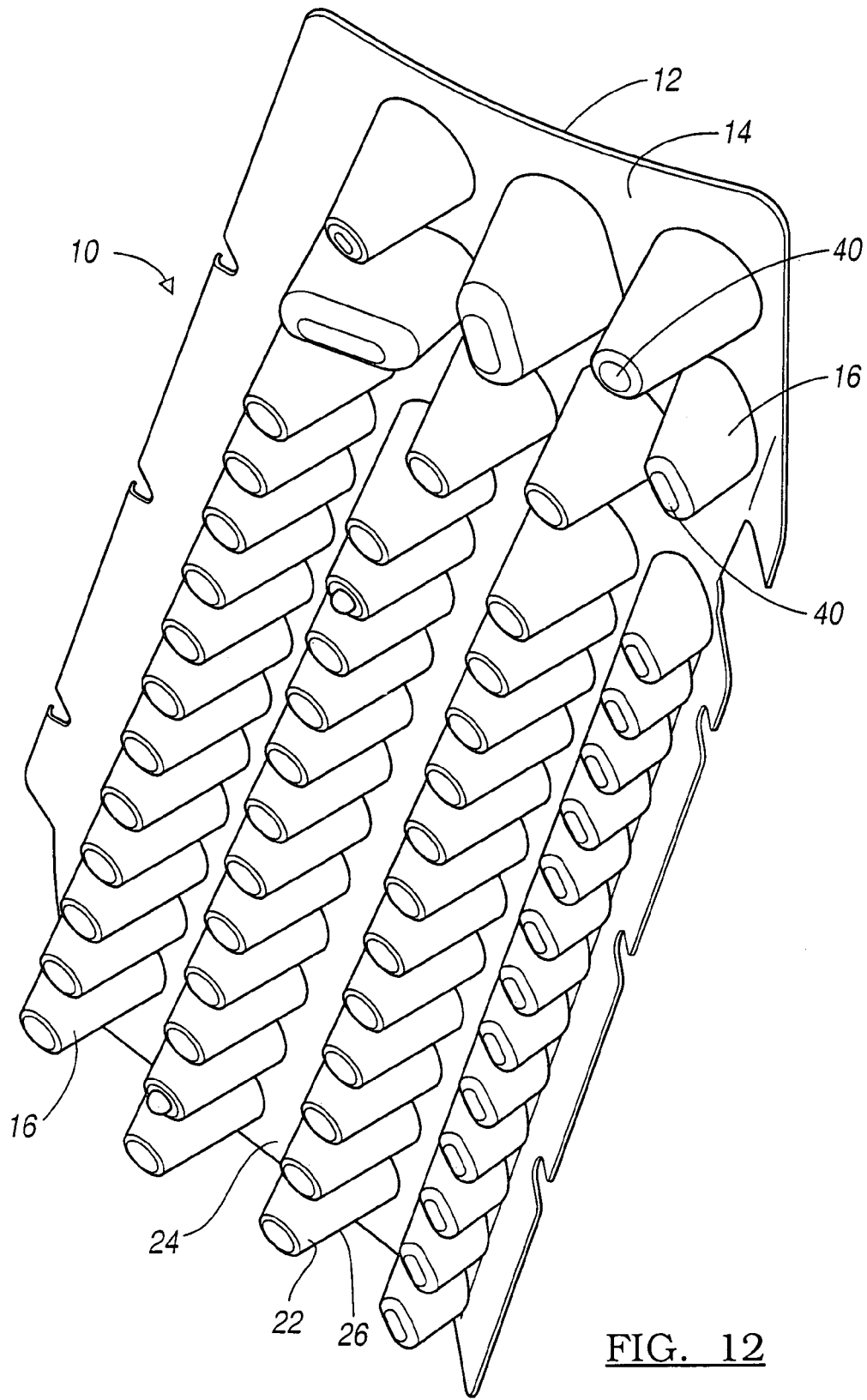
FIG. 12 depicts an alternate embodiment.

FIG. 4 depicts a floor 40 that extends at least partially between opposing faces of a wall 38. In one embodiment, the floor is annular. Alternatively, the floor may extend from an intermediate section 26 of the wall 38. It should be appreciated, that in some embodiments (e.g., FIG. 12), the floor may have a configuration that is non-planar. For example, where the floor 40 is provided proximate an upper extremity or perimeter 22 of an energy absorbing unit 16, the floor 40 may undulate or be otherwise configured (either upwardly-convex or downwardly concave) in order to conform the modular energy absorber 10 to the spatial constraints imposed by the environment in which the absorber 10 is installed.

Figure 5:
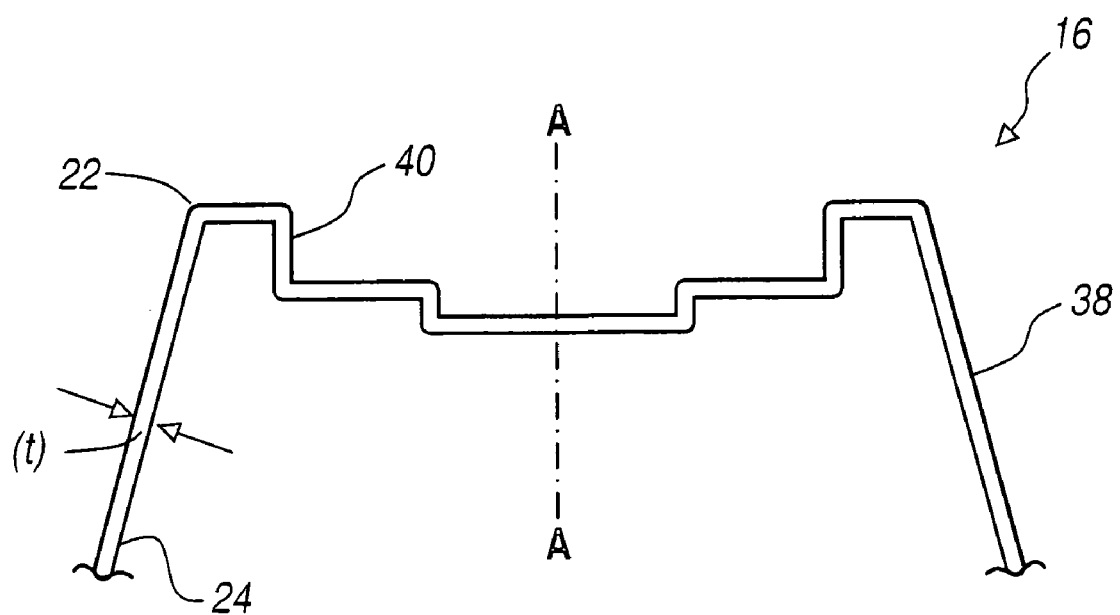
FIG. 5 illustrates an alternate embodiment of the invention wherein an energy absorbing unit has a first floor that is shaped like an inverted wedding cake, in a more rounded form, or like a volcano with craters (concavities) therein.
Figure 6:
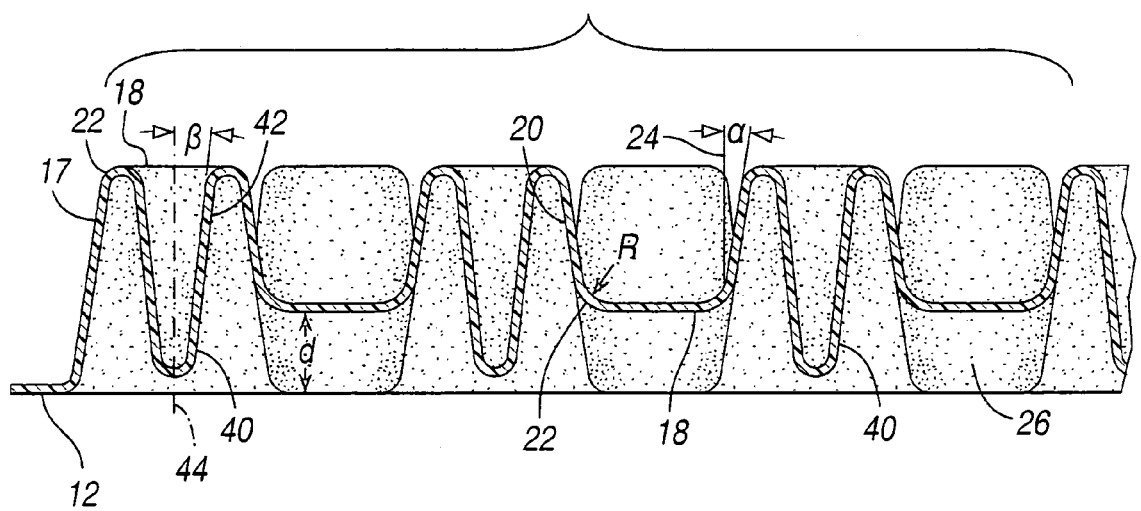
FIG. 6 is a cross-sectional view of an embodiment of the invention in which a floor extends between second walls of adjacent energy absorbing units, wherein the floor is generally flat.
Figure 7:
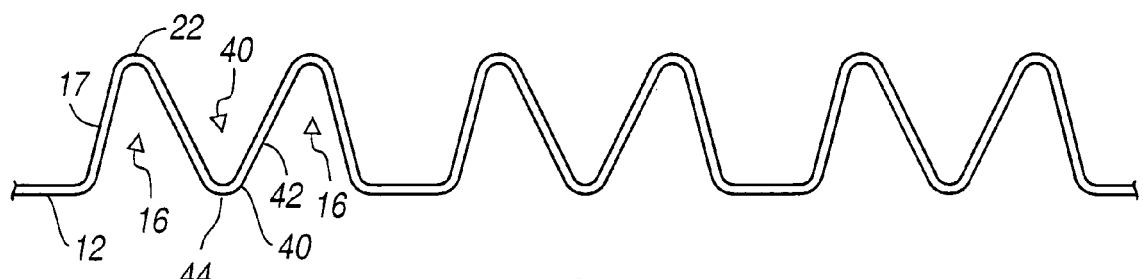
FIG. 7 is a cross-sectional view of an alternate embodiment of the invention.
Figure 8:
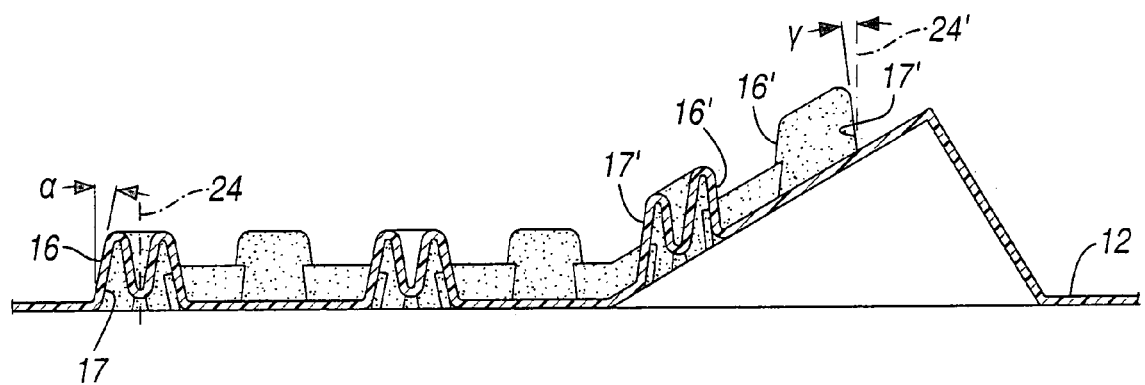
FIGS. 8-9 depict further alternative embodiments of the invention.
Figure 9:
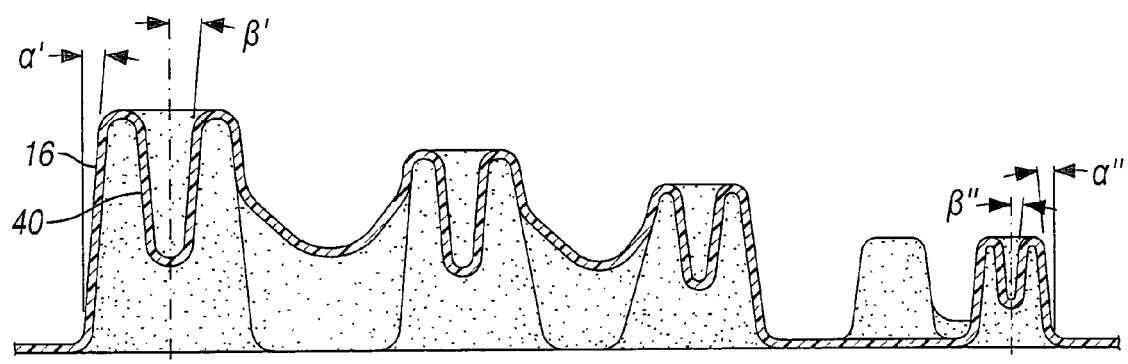
Figure 10:
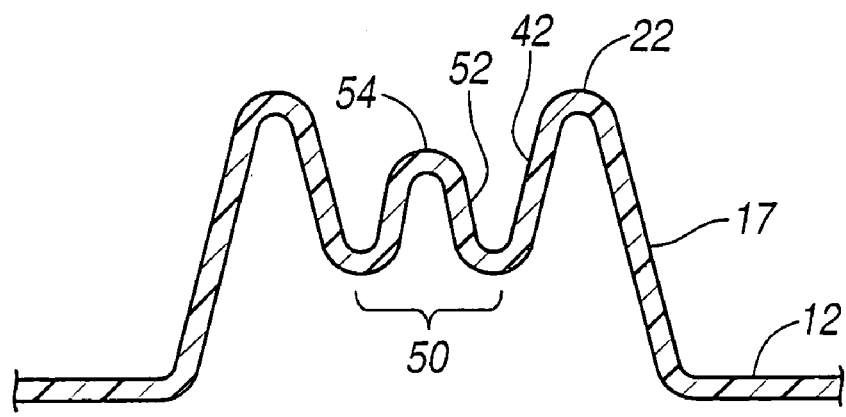
FIG. 10 is a cross-sectional view of an energy absorbing unit shaped as a volcano with one or more craters (convexities) extending upwardly therefrom.

In FIG. 5, the floor is configured with a topography that is akin to an inverted wedding cake with one or more layers. Alternatively, the floor 40 can be configured in a more rounded form as a volcano type of structure, including one or more craters defined therewithin (e.g., FIG. 10). As noted earlier, other embodiments include convex or concave floors 40. Continuing with reference to FIG. 5, some of the one or more energy absorbing units 16 have an imaginary axis of symmetry A-A to which the floor 40 may be inclined at an angle between zero and 180 degrees.

It will be appreciated that as a result of "tuning" the energy absorber (e.g. dimensional control of wall height, provision of slits or slots or neither, wall thickness, and material selection), the configuration following impact may, if desired, be located in substantially the same position as the pre-impact configuration.

Continuing with primary reference to FIGS. 2(b), 4-5, it will be appreciated that the wall 38 is characterized by a thickness (t) which may or may not be uniform between a top edge 22 and a lower edge 24 of the wall 38. In some configurations, where particular energy absorbing characteristics are desired or mandated, the wall 38 of a given energy absorbing unit 16 may have an average thickness ($t_1$) that differs from an average thickness ($t_2$) of a wall associated with another energy absorbing unit. Similarly for floor thickness (40).

In some embodiments (FIG. 4 for example), the means for coordinating 36 may be in the form of one or more channels 46,48. While the coordinating means may be located at an intermediate section 26 of a wall 38, it will be appreciated that it may also lie proximate its top or bottom edges 22,24. Preferably, one or more channels 46,48 are provided, so that stiffness in one direction versus flexibility in another direction are provided. This affords additional latitude to the designer who may wish to confer stiffness in one direction for impact resistance, yet flexibility in another direction to enable a given energy absorbing module to bend or conform to the spatial constraints imposed by the environment in which the energy absorber is installed.

Returning again to FIGS. 1-2, the embodiments depicted allow the designer to choose how best to locate the energy absorbing units 16 within a given module. To facilitate an understanding of positional considerations, it is helpful to imagine that each energy absorbing unit 16 has an axis of symmetry which when projected may intersect an imaginary plane at certain loci. An imaginary line can be drawn connecting adjacent loci in that plane. The energy absorbing units 16 may be configured so that the line joining adjacent loci describes a geometrical figure. That figure may, for example, be a segmented line, a circle, an oval, an ellipse, a square, a diamond, a quadrilateral, and a polygon.

With reference to FIGS. 2(a-c) and 12, the lower perimeter 24 of a given energy absorbing unit 16 may, for example, describe a circle, an oval, an oblate oblong or an ellipse. Similarly for the upper perimeter 22 and intermediate section 16. Combinations of such shapes among adjacent energy absorbing units are deemed within the scope of the invention. See, e.g., FIG. 12.

In certain environments, a protrusion such as an HVAC duct, a coat hook, a sun visor, a wiring harness, or the head of a bolt may invade the space that could be occupied by a vehicle occupant. Ideally, it would be desirable to provide an energy absorber having enhanced stiffness characteristics around such a protrusion. One way to provide such an absorber is to configure an energy absorbing unit such as that depicted in FIG. 10. In that embodiment, energy absorption is provided by the outer 17 and inner wall 42, 52—either together or sequentially during deformation. This gives the designer the latitude to provide an inner wall 42 that may be tuned independently of the energy absorbing characteristics of the outer wall 17. If desired, the floor 50 at the foot of the inner wall 42 may effectively bottom out during energy absorption so that the amount of resistance to greater deflection is more than the resistance offered before bottoming out. In some ways, this configuration, if desired, could be considered as the functional equivalent of providing an inner energy absorbing structure which provides a subsequent line of defense.

It will be appreciated that where injection molding is the manufacturing method of choice, slots are the preferred weakening mechanism to be provided in the wall structure. Where thermoforming is the manufacturing method of choice, slits are preferred because there is no requirement to remove slugs of unwanted material. It will be appreciated that slots tend to weaken the energy absorbing structure, other things being equal, while reducing the weight of the energy absorbing unit.

Figure 11:
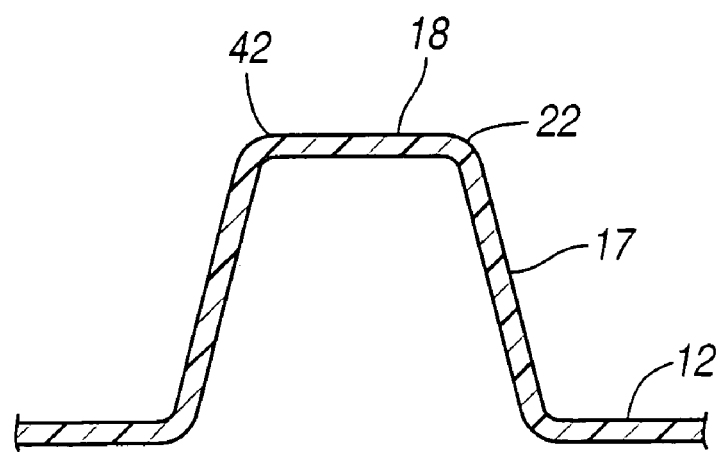
FIG. 11 is a cross-sectional view of an ultimate embodiment of an energy absorbing unit with a domed surface extending from the intermediate wall.

In FIGS. 6-9, there are depicted alternate embodiments of the energy absorber which have a means for connecting adjacent energy absorbing units, such as a base or basal connecting member 12 and a plurality of first recesses 16 defined extending from the base. At least some of the recesses 16 have a rim 22, and at least one first wall 17 extending from the rim to the base 12. The rim 22 may have an average radius (R), or may be non-circular (termed herein as "curvilinear"). Preferably, the rim 22 has a flat or domed (convex) portion 18 (FIG. 11), although the rim does not have to be substantially flat. One or more second recesses 40 extend into at least some of the first recesses 16. A second recess 40 has a second wall 42 and a floor 44. The floor 44 may be concave, convex (as shown in FIG. 11), or it may be substantially flat. Further, the floor may merely be a rim similar to the rim 22.

It will be apparent that in many applications, the energy absorber 10 in any of FIGS. 1-10 may perform satisfactorily in an inverted position.

2. The Design Method

One preferred (but not exclusive) method of manufacturing is thermoforming. It is known that thermoforming involves stretching a heated plastic sheet of constant thickness over a tool in the shape of the desired part. The stretching step results in a thinning of the sheet and ultimately in a non-uniform thickness distribution within the part may result.

A method for configuring a modular energy absorber comprises the steps of:

selecting one or more energy absorbing units according to given spatial constraints and desired energy absorbing criteria;

providing a means for coordinating energy absorbing units with a pre-defined contoured topography;

locating one or more energy absorbing units in association with the means for coordinating energy absorbing units so that the one or more energy absorbing units are positioned in relation to each other before, during and after relative motion between an incident object and the energy absorber;

providing a wall within some of the one or more energy absorbing units so that the wall provides an upper perimeter, a lower perimeter, and an intermediate section extending therebetween;

defining a number (m) of breaches within the wall, (m) being an integer selected from the group consisting of (0, 1, 2, 3, . . . , 1000);

providing a number (n) of apertures defined within the means for coordinating energy absorbing units, (n) being an integer selected from the group consisting of (0, 1, 2, 3, . . . 1000);

quantifying the resulting modular energy absorbing characteristics of the absorbing structure;

comparing the characteristics with those desired; and reiterating as necessary.

3. The Manufacturing Method

The disclosed energy absorber can be manufactured at relatively low cost by thermoforming and impact performance can be optimized without expensive tooling modification at heights below about 50 millimeters. However, above this height, the base material thickness required to produce an energy absorber for the appropriate crush resistance is such that it cannot easily and inexpensively be produced using in-line thermoforming equipment. In such circumstances, injection molded absorbers can be produced, perhaps at a lower cost.

Historically, optimizing crush resistance or the amount of energy absorbed by injection molded energy absorbers that are formed from rows of ribs have been difficult and expensive to modify once the mold has been produced. Modifying rib thickness is usually accomplished by adding material to or removing material from the mold by burning, cutting, inserting and the like.

It is often difficult to produce injection molded wall sections having a thickness less than about 1.25 millimeters. In such circumstances, multi-drop hot runner systems have been used to prevent the material from "freezing off" in the thin sections. Cuts or areas devoid of material have been used to weaken such ribs, but prove to be less efficient because they may create additional manufacturing issues. When ribs are integrated into the back side of class A surfaces (whose appearance is critical), changes in the ribs can "read through" and result in a product whose appearance is unacceptable.

It is therefore essential that an absorber's crush resistance be "tuned" or "dialed up or down" to provide the greatest measure of energy management or the highest level of occupant protection for a given set of impact conditions. Foam energy absorbers can be tuned by a change in density, but have proven to be less efficient than those composed of metal, thermoplastic, or composite materials. Metal and composite absorbers are proven to be more expensive than their plastic counterparts, such as injection molded and thermoformed energy absorbers.

Preferably, the disclosed energy absorbers include a structure with recesses in a base sheet and are produced by injection or compression molding. The recesses, for example, may have a minimum wall thickness of about 1.25 millimeters. Small tapered or drafted areas may have a thickness which is below this thickness.

The walls of the recesses may be thicker than 1.25 millimeters, but may have areas as thin as 1.25 millimeters to promote buckling of the recess at a given point.

Slits (no material removed), or slots (areas devoid of material) may be provided which run mostly parallel to the walls of a given energy absorbing unit. Such breaches may or may not be present, but when present, the slots may or may not be of varying width. As discussed earlier, ribs that protrude from the interior or exterior of a wall of an energy absorbing unit (e.g., FIG. 4) may or may not be present.

When present, the ribs 51 (FIG. 4) run mostly parallel to a wall of a recess, and may have convolutions which promote the buckling of a recess at a given point. It will be appreciated that to produce given energy management characteristics, the ribs 51 may vary in both height and width.

In one example, a minimum wall thickness of 1.25 mm promotes material flow within the mold for injection molded designs with a minimal number of injection ports. Below this thickness, formed articles have more shear stress caused by forcing a polymer into a thin section. Thin sections are also difficult to fill. This involves higher injection molding pressures, larger equipment, higher utility costs and higher scrap rates. Areas thicker than 1.25 mm are less prone to these issues. By maintaining a minimum wall thickness of 1.25 mm, the cost to tool an absorber is minimized. Also, by increasing or decreasing the wall thickness, the crush resistance of the absorber can be tuned to optimize the impact performance.

The presence of breaches, such as slits, or slots reduces the crush resistance of a given energy absorbing unit. The number of slits 28 (FIG. 1(*c*)) can also be changed to optimize impact performance to a lesser degree. Preferably, but not necessarily, the slits should run the entire length of the wall 16 (see, e.g., FIG. 1(*d*)). By doing so, knit lines (areas where two melted fronts of plastic come together which have proven to be weak points in the formed article) are forced toward areas which are less involved in energy management—such as the base or the roof of the recess.

If desired, ribs 51 which protrude from either side of the recess wall (FIG. 4), can be added or reduced in size to either increase or decrease the crush resistance of the structure. When present, ribs 51 may also provide a channel that promotes material flow to areas adjacent to the rib. The rib height and width can be varied to increase or decrease crush resistance. In the preferred embodiment, the ribs are present on the interior of an energy absorbing unit.

Injection molds can be manufactured from a solid block of material or can be composed of a number of inserts. The preferred embodiment of each recess is frustoconical in shape. The advantage of this design is that it lends itself to both a simple and inexpensive means of optimizing impact performance through the use of inserts for the cone interior. These inserts are typically produced inexpensively on a numerically controlled lathe, rather than by more expensive methods such as CNC machining and EDM techniques. The wall thickness of the recess can be easily changed by either modifying or simply replacing the original insert with one whose profile is different. By changing the wall thickness, the crush resistance can also be changed.

In summary, the crush resistance of each recess can be varied in order to optimize the impact performance with a minimal impact on tooling cost. It also lends itself to high manufacturing rates and low costs versus current competitive products, while still providing excellent impact performance.

4. Experimental Observations

Experiments have been performed to predict the resistance characteristics of a given absorber design, (e.g. made from polypropylene: Basell Pro-fax SV 152) and efficiently tune or optimize its geometry to match known benchmarks (up to 80 psi) of given countermeasures for automotive side impact.

Here is a summary of the results:

| # of Slits | Impact Angle (degrees) | Wall Thickness (mm) | Rib Height (mm) | Peak Pressure (PSI) | Mean Pressure (PSI) | Std. Dev. Pressure (PSI) | Cone Mass (tonnes) |
|---|---|---|---|---|---|---|---|
| 0 | 0 | 1.25 | 0 | 141.57 | 86.79 | 29.53 | 0.0081 |
| 2 | 27 | 1.65 | 1.25 | 115.42 | 61.08 | 16.63 | 0.0118 |
| 2 | 0 | 1.25 | 0 | 54.01 | 20.74 | 12.20 | 0.0081 |

Procedure: Transient finite element simulation of rigid plane (oriented normal to cone axis) impacting a single cone at constant velocity Cone Materials modeled: Pro-fax SV152 PP; Cycolac EX75 ABS, Cycolac MC8800, Cycoloy IP1000

No strain rate dependency modeled to reflect quasi-static performance

Cone supported by contact with rigid plane

Cone geometry—10 degrees draft, 15 mm top diameter; no ribs

Impact speed=33 mph (FMVSS214 resultant speed) to reduce simulation run time

Area for pressure calculation=maximum area that can be impacted and only affect one cone.—Assumed area at base of model (64 mm diameter)

Raw data filtered with SAE1000 (as other filters smoothed too much)

| Variables: | Impact Angle | (0°, 14°, 27°) |
|---|---|---|
| | Part Thickness | (1.25 mm, 1.6 mm, 2.0 mm) |
| | Number of 75 mm long Slits in Cone Wall | (0, 1, 2, 4) |
| | Height of Ribs inside Cone | (0, 1.25 mm, 2.5 mm) |

Rows: 108 (Full Factorial)

Measurements: Peak Pressure exerted on impactor

Mean Pressure exerted on impactor during entire event

Standard Deviation of Pressure during entire event

Temperature: Room temperature (no temp effects considered)

Analysis of results: DOE pre and post processing using Altair Hyperworks® software suite Simulation performed by LS-DYNA3D® nonlinear finite element solver Analysis of results using JMP statistical software—Effects screening for main effects and interactions Stepwise Backward Regression for transfer functions Experimental observations reveal that the resistance characteristics of the energy absorbing units are most sensitive to the number of slits or slots and wall thickness. The mean pressure exerted by an energy absorbing module in response to an impacting force can also be tuned by adjusting the spacing between energy absorbing units within practical manufacturing and performance limits. One can therefore optimize the resistance pressure of the module for a given set of impact conditions by changing the design of the units and their spatial orientation within the module. The design approach ultimately depends on whether the absorber interacts with the occupant and thus necessity for load transfer or energy management.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A modular energy absorber comprising:
   one or more energy absorbing modules, one or more of which having:
   means for coordinating energy absorbing units, of the one or more modules, the means for coordinating having a pre-defined, contoured topography including a number (n) of apertures defined in a central region of the means for coordinating for optional weight reduction or to facilitate attachment, where n is an integer $\geq 0$; and
   one or more crushable energy absorbing units associated with the means for coordinating, the means for coordinating positioning the one or more units in relation to each other before, during and after relative motion between an incident object and the energy absorber, so that impact forces resulting therefrom are at least partially absorbed by the energy absorbing units, at least some of the units including
   an upper perimeter, a lower perimeter and an intermediate wall extending therebetween with a number (m) of breaches defined in a middle portion of the intermediate wall before impact for tuning where m is an integer $\geq 1$, the wall at least partially collapsing during energy absorption;
   wherein at least some of the energy absorbing units are oriented such that their intermediate walls are inclined to a major incident component of an impacting force, and wherein some of the energy absorbing units cooperate to afford mutual support in decelerating an object that imparts the impacting force.

2. The modular energy absorber assembly of claim 1 further comprising:
   a hinge section having leaves between a pair of modules, the hinge section providing a localized region of engineered weakness between at least some of the energy absorbing modules that allows the absorber to be bent preferentially and thus conform with spatial constraints imposed by an environment in which the absorber is positioned, each leaf extending from one of the one or more means for coordinating so that the absorber may be configured within spatial constraints imposed by an environment within which the absorber is positioned, the environment being selected from the group consisting of a headliner in a vehicle, a bumper assembly, a knee bolster, and a side-impact location including a vehicle pillar, an armrest, and a door.

3. The modular energy absorber of claim 1 wherein the number (n) of apertures equals zero.

4. The modular energy absorber of claim 1 wherein the means for coordinating comprises a form selected from the group consisting of a hinge, a planar surface, a rib, a channel, a non-planar surface, and combinations thereof.

5. The modular energy absorber of claim 1 wherein at least one of the one or more energy absorbing units includes a floor extending at least partially between opposing faces of the middle portion of an intermediate wall or the upper perimeter.

6. The modular energy absorber of claim 5 wherein the floor is annular.

7. The modular energy absorber of claim 5 wherein the floor extends within the upper perimeter.

8. The modular energy absorber of claim 5 wherein some of the one or more energy absorbing units have an imaginary axis of symmetry and at least a segment of the floor is inclined to the axis of symmetry.

9. The modular energy absorber of claim 1 wherein a released configuration following rebound is located in substantially the same position as a pre-impact undeflected configuration.

10. The modular energy absorber of claim 1 wherein the intermediate wall has a thickness, the thickness being non-uniform between the upper and lower perimeters.

11. The modular energy absorber of claim 10 wherein the intermediate wall of a given energy absorbing unit has an average thickness ($t_1$) that differs from an average thickness ($t_2$) of a wall associated with another energy absorbing unit.

12. The modular energy absorber of claim 8 wherein each axis of symmetry defines positioning loci that intersect a given plane, and a line that joins adjacent loci in that plane describes a geometrical figure selected from the group consisting of a segmented line, a circle, an oval, an oblong, an ellipse, a square, a diamond, a quadrilateral, and a polygon.

13. The modular energy absorber of claim 1, wherein a lower perimeter of an energy absorbing unit defines a geometric figure that is selected from the group consisting of a circle, an oval, an oblong, an oblate oblong, a polygon, and an ellipse.

14. The modular energy absorber of claim 1, wherein an upper perimeter of an energy absorbing unit defines a geometric figure that is selected from the group consisting of a circle, an oval, an oblong, an oblate oblong, a polygon, and an ellipse.

15. The modular energy absorber of claim 1, wherein an intermediate section defines a geometric figure that is selected from the group consisting of a circle, an oval, an oblong, an oblate oblong, a polygon, and an ellipse.

16. The modular energy absorber of claim 4 wherein the means for coordinating includes a form selected from the group consisting of a rib, a channel and combinations thereof.

17. The modular energy absorber of claim 4 further including a rib that protrudes from the interior of a wall of an energy absorbing unit.

18. The modular energy absorber of claim 4 further including a rib that protrudes from the exterior of a wall of an energy absorbing unit.

19. A modular energy absorber comprising:
    one or more energy absorbing modules, one or more of which having:

means for coordinating energy absorbing units, of the one or more modules, the means for coordinating having a number (n) of apertures defined in a central region of the means for coordinating for optional weight reduction or to facilitate attachment, where n is an integer $\geq 1$; and one or more crushable energy absorbing units associated with the means for coordinating, the means for coordinating positioning the one or more units in relation to each other before, during and after relative motion between an incident object and the energy absorber, so that impact forces resulting therefrom are at least partially absorbed by the energy absorbing units, at least some of the units including an upper perimeter, a lower perimeter and an intermediate wall extending therebetween with a number (m) of breaches defined in a middle portion of the intermediate wall before impact for tuning where m is an integer $\geq 0$, the wall at least partially collapsing during energy absorption;

wherein at least some of the energy absorbing units are oriented such that their intermediate walls are inclined to a major incident component of an impacting force, and wherein some of the energy absorbing units cooperate to afford mutual support in decelerating an object that imparts the impacting force and $(m+n) \geq 1$.

20. A method for configuring a modular energy absorber comprising the steps of:

selecting one or more energy absorbing units in an energy absorbing module according to spatial constraints and desired energy absorbing criteria;

providing a means for coordinating energy absorbing units, the means having a pre-defined contoured topography;

locating one or more energy absorbing units in association with the means for coordinating energy absorbing units so that the one or more energy absorbing units are positioned in relation to each other before, during and after relative motion between an incident object and the energy absorber;

defining a number (m) of breaches within a middle portion of the wall, (m) being an integer selected from the group consisting of (0, 1, 2, 3, . . . , 1000);

determining a wall thickness profile;

providing a number (n) of apertures defined in a central region of the means for coordinating energy absorbing units for optional weight reduction or to facilitate attachment, (n) being an integer selected from the group consisting of (1, 2, 3, . . . , 1000);

observing the actual energy absorbing characteristics of the modular energy absorbing structure;

comparing the actual characteristics with those desired; and reiterating as necessary.

* * * * *

(12) EX PARTE REEXAMINATION CERTIFICATE (10167th)
United States Patent
Cormier et al.

(10) Number: US 7,404,593 C1
(45) Certificate Issued: May 16, 2014

(54) MODULAR ENERGY ABSORBER OF VARYING TOPOGRAPHY AND METHOD FOR CONFIGURING SAME

(75) Inventors: Joel Matthew Cormier, Ferndale, MI (US); Richard Francois Audi, Dearborn, MI (US)

(73) Assignee: Oakwood Energy Management, Inc., Dearborn, MI (US)

Reexamination Request:
No. 90/013,032, Nov. 26, 2013

Reexamination Certificate for:
Patent No.: 7,404,593
Issued: Jul. 29, 2008
Appl. No.: 11/014,418
Filed: Dec. 16, 2004

Related U.S. Application Data

(63) Continuation-in-part of application No. 10/760,760, filed on Jan. 20, 2004, now Pat. No. 7,360,822, which is a continuation of application No. 10/004,739, filed on Dec. 4, 2001, now Pat. No. 6,752,450, which is a continuation-in-part of application No. 09/884,813, filed on Jun. 19, 2001, now Pat. No. 6,682,128, which is a continuation-in-part of application No. 09/499,205, filed on Feb. 7, 2000, now Pat. No. 6,247,745, said application No. 10/760,760 is a continuation-in-part of application No. 09/617,691, filed on Jul. 17, 2000, now Pat. No. 6,679,967.

(51) Int. Cl.
*B60R 21/04* (2006.01)

(52) U.S. Cl.
USPC ....... 296/187.03; 188/371; 280/751; 293/133

(58) Field of Classification Search
None
See application file for complete search history.

(56) References Cited

To view the complete listing of prior art documents cited during the proceeding for Reexamination Control Number 90/013,032, please refer to the USPTO's public Patent Application Information Retrieval (PAIR) system under the Display References tab.

*Primary Examiner* — Russell Stormer

(57) ABSTRACT

A modular energy absorber 10 that is tunable. It comprises one or more energy absorbing modules 12. The energy absorbing modules have means for coordinating energy absorbing units 16 of the one or more modules. The means 14 for coordinating position and support the units in relation to each other before, during and after relative motion between an incident object and the energy absorber. A crushable member 16 is provided that has an upper perimeter 22, a lower perimeter 24 and an intermediate wall 26 extending therebetween. It also includes a number (m) of breaches defined therein before impact. A method for configuring the modular energy absorber is also disclosed.

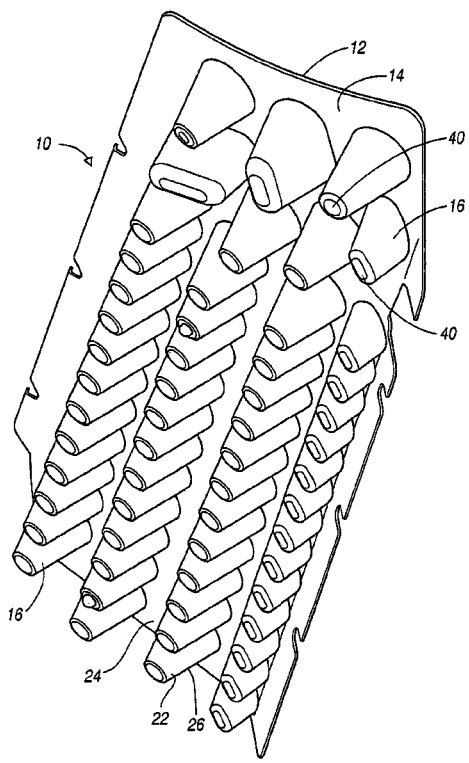

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 7 is cancelled.

Claims 1, 5, 15, 19 and 20 are determined to be patentable as amended.

Claims 2-4, 6, 8-14 and 16-18, dependent on an amended claim, are determined to be patentable.

New claims 21-37 are added and determined to be patentable.

1. A modular energy absorber comprising:
one or more energy absorbing modules, one or more of which having:
means for coordinating energy absorbing units of the one or more modules, the means for coordinating having a pre-defined, contoured topography including a number (n) of apertures defined in a central region of the means for coordinating for optional weight reduction or to facilitate attachment, where n is an integer ≥0; and
one or more crushable energy absorbing units [associated with] *separated by the means for coordinating and formed within and extending from* the means for coordinating, *the means for coordinating extending between the separated crushable energy absorbing units and positioning the one or more units in relation to each other* before, during and after relative motion between an incident object and the energy absorber, so that impact forces resulting therefrom are at least partially absorbed by the energy absorbing units, at least some of the units including
an upper perimeter, a lower perimeter, *a floor extending across the upper perimeter,* and an intermediate wall extending [therebetween] *between the perimeters* with a number (m) of breaches defined in a middle portion of the intermediate wall before impact for tuning where m is an integer ≥1, *each breach being one of an elongated slit and a slot,* the wall at least partially collapsing during energy absorption;
wherein at least some of the energy absorbing units are oriented such that their intermediate walls are inclined to a major incident component of an impacting force, and wherein some of the *separated* energy absorbing units cooperate *through the means for coordinating* to afford mutual support in decelerating an object that imparts the impacting force.

5. The modular energy absorber of claim 1 wherein at least one of the one or more energy absorbing units includes a floor extending at least partially between opposing faces of the middle portion of an intermediate wall [or the upper perimeter].

15. The modular energy absorber of claim 1, wherein an intermediate [section] *wall* defines a geometric figure that is selected from the group consisting of a circle, an oval, an oblong, an oblate oblong, a polygon, and an ellipse.

19. A modular energy absorber comprising:
one or more energy absorbing modules, one or more of which having:
means for coordinating energy absorbing units, of the one or more modules, the means for coordinating having a number (n) of apertures defined in a central region of the means for coordinating for optional weight reduction or to facilitate attachment, where n is an integer ≥1; and
one or more crushable energy absorbing units [associated with] *separated by the means for coordinating and formed within and extending from* the means for coordinating *at respective locations spaced apart from the apertures defined in the means for coordinating,* the means for coordinating *extending between the separated crushable energy absorbing units and* positioning the one or more units in relation to each other before, during and after relative motion between an incident object and the energy absorber, so that impact forces resulting therefrom are at least partially absorbed by the energy absorbing units, at least some of the units including
an upper perimeter, a lower perimeter, *a floor extending across the upper perimeter,* and an intermediate wall extending [therebetween] *between the perimeters,* with a number (m) of breaches defined in a middle portion of the intermediate wall before impact for tuning where m is an integer ≥0, *each breach being one of an elongated slit and a slot,* the wall at least partially collapsing during energy absorption;
wherein at least some of the energy absorbing units are oriented such that their intermediate walls are inclined to a major incident component of an impacting force, and wherein some of the *separated* energy absorbing units cooperate *through the means for coordinating* to afford mutual support in decelerating an object that imparts the impacting force and (m+n)≥1.

20. A method for configuring a modular energy absorber comprising the steps of:
selecting one or more energy absorbing units in an energy absorbing module according to spatial constraints and desired energy absorbing criteria;
providing a means for coordinating energy absorbing units, the means having a pre-defined contoured topography *and the one or more energy absorbing units being formed within and extending from the means for coordinating*;
locating *the* one or more energy absorbing units [in association with] *formed within* the means for coordinating energy absorbing units so that the one or more energy absorbing units are *separated by the means for coordinating, with the means for coordinating extending between the separated units, and are* positioned *by the means for coordinating* in relation to each other before, during and after relative motion between an incident object and the energy absorber, *at least some of the units including an upper perimeter, a lower perimeter, a floor extending across the upper perimeter, and an intermediate wall extending between the perimeters*;
defining a number (m) of breaches within a middle portion of the *intermediate* wall, (m) being an integer selected from the group consisting of (0, 1, 2, 3, . . . , 1000), *each breach being one of an elongated slit and a slot*;
determining a wall thickness profile;
providing a number (n) of apertures defined in a central region of the means for coordinating energy absorbing units for optional weight reduction or to facilitate attachment, (n) being an integer selected from the group consisting of (1, 2, 3, . . . , 1000);

observing the actual energy absorbing characteristics of the modular energy absorbing structure;

comparing the actual *energy absorbing* characteristics with those desired; and reiterating as necessary.

21. The modular energy absorber of claim 1 wherein:
each breach is elongated in a direction running along the length of the intermediate wall between the upper and lower perimeters.

22. The modular energy absorber of claim 1 wherein:
each breach is a slit, and the means for coordinating and the one or more energy absorbing units are thermoformed.

23. The modular energy absorber of claim 1 wherein:
each breach is a slot, and the means for coordinating and the one or more the energy absorbing units are injection molded.

24. The modular energy absorber of claim 1 wherein:
the slit is a cut or gash defined in the middle portion of the intermediate wall without removal of material from the intermediate wall.

25. The modular energy absorber of claim 1 wherein:
the slot is an aperture with facing edges defined in the middle portion of the intermediate wall with removal of material from the intermediate wall.

26. The modular energy absorber of claim 1 wherein:
each slot is of varied width.

27. The modular energy absorber of claim 1 wherein:
at least one breach of at least one of the energy absorbing units runs the entire length of the intermediate wall between the upper and lower perimeters.

28. The modular energy absorber of claim 1 wherein:
at least one breach of at least one of the energy absorbing units runs at least a partial length of the intermediate wall between the upper perimeter and the middle portion.

29. The modular energy absorber of claim 1 wherein:
at least one breach of at least one of the energy absorbing units runs at least a partial length of the intermediate wall between the lower perimeter and the middle portion.

30. The modular energy absorber of claim 1 wherein:
at least one of the energy absorbing units has three breaches defined in the middle portion of the intermediate wall.

31. The modular energy absorber of claim 1 wherein:
at least one of the energy absorbing units includes an intermediate wall extending between upper and lower perimeters with a breach defined in a middle portion of the intermediate wall, the middle portion of the intermediate wall and the breach each having a longitudinal axis which are parallel to one another.

32. The modular energy absorber of claim 1 wherein:
the means for coordinating and the one or more energy absorbing units are of a thermoformed plastic including a polypropylene copolymer.

33. The modular energy absorber of claim 19 wherein:
the means for coordinating and the one or more energy absorbing units are of a thermoformed plastic including a polypropylene copolymer.

34. The modular energy absorber of claim 1 wherein:
the energy absorbing units include recesses.

35. The modular energy absorber of claim 19 wherein:
the energy absorbing units include recesses.

36. The modular energy absorber of claim 1 wherein:
each energy absorbing unit is frustoconical.

37. The modular energy absorber of claim 19 wherein:
each energy absorbing unit is frustoconical.

\* \* \* \* \*